Figure 1:
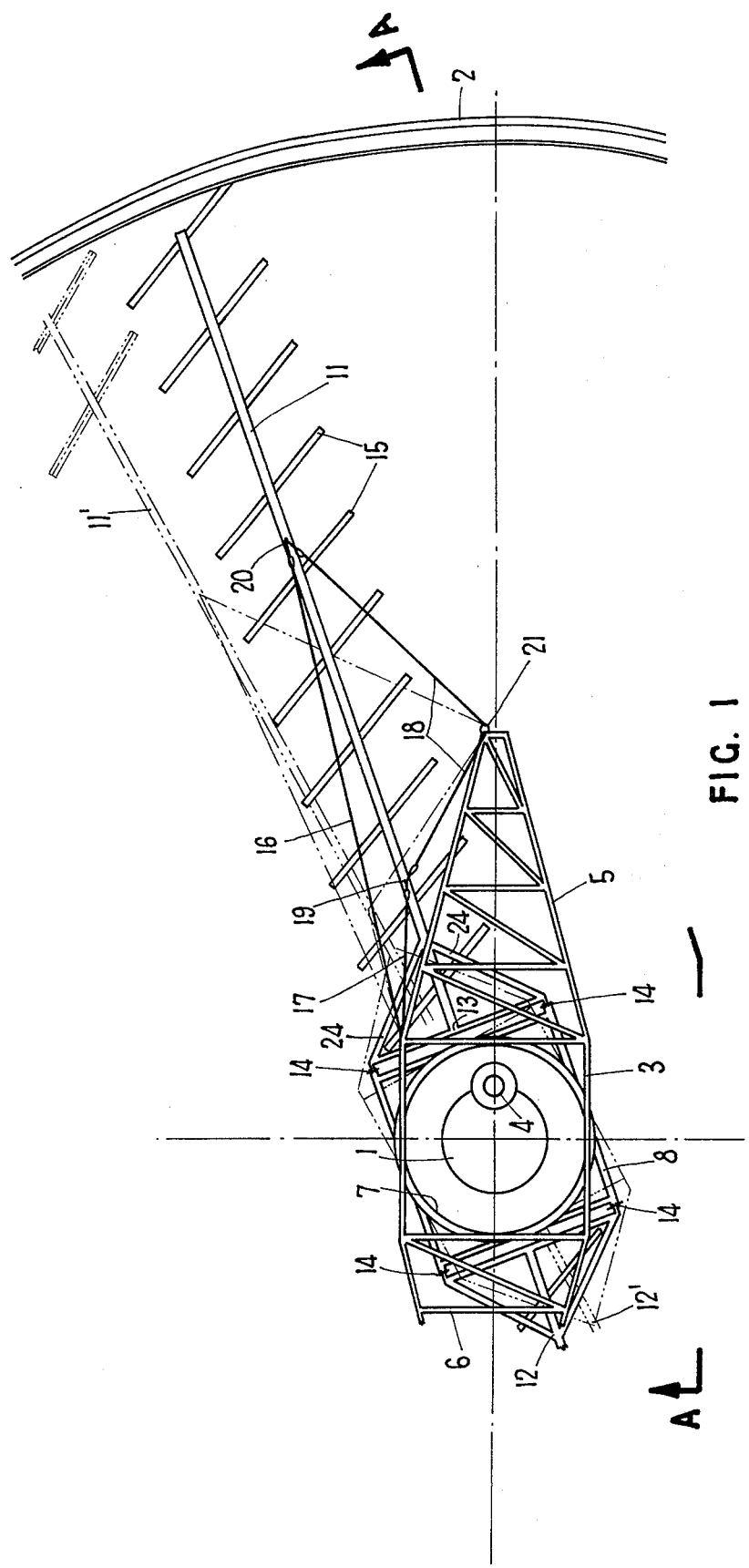

United States Patent [19]

Grzina et al.

[11] 3,933,655

[45] Jan. 20, 1976

[54] CABLE-CONTROLLED THICKENER

[75] Inventors: Anthony Grzina, Artarmon, Australia; John Henry Ephraim Fedeler, Southbury, Conn.

[73] Assignee: Warman Equipment International, Artarmon, Australia

[22] Filed: Mar. 12, 1974

[21] Appl. No.: 450,496

[52] U.S. Cl. .................................. 210/528
[51] Int. Cl.² ............................... B01D 21/18
[58] Field of Search ......... 210/519, 520, 523, 525, 210/527, 528, 531

[56] References Cited
UNITED STATES PATENTS

| | | | |
|---|---|---|---|
| 2,557,316 | 6/1951 | Scott | 210/531 |
| 2,585,006 | 2/1952 | Graner et al. | 210/531 X |
| 3,295,835 | 1/1967 | Klopper | 210/528 X |
| 3,465,888 | 9/1969 | Jablon | 210/531 |
| 3,542,207 | 11/1970 | Stansmore | 210/520 |
| 3,549,017 | 12/1970 | Theidel | 210/531 |
| 3,616,910 | 11/1971 | Geriche | 210/531 |

Primary Examiner—Theodore A. Granger
Attorney, Agent, or Firm—Waters, Schwartz & Nissen

[57] ABSTRACT

A cable-controlled thickener for a settling tank is provided with rake arms which are hinged for movement in a vertical plane only at the lower end of a freely rotatable structure which is suspended from a driving mechanism, the suspension arrangement being located above the highest possible liquid level in the tank.

7 Claims, 4 Drawing Figures

CABLE-CONTROLLED THICKENER

The invention relates to thickener mechanisms as used for settling of slurries, sludges, concentrates, tailings or the like and in particular to cable-controlled thickeners.

Many designs of continuously operating thickeners are known in which rake arms carrying rake blades are rotated about a vertical shaft through the slurry in a settling tank or the like. For such thickeners it was necessary to provide a lift mechanism for the rake arms to lift the rake blades out of the slurry when the latter encounter an obstacle or the settling solids become too dense.

This lifting of the rake arms can be achieved either by a screw-type lifting mechanism or by cables used to pull the rake arms with the blades thereon through the slurry.

Cable-controlled thickeners are known in which the ends of the rake arms are connected by a type of universal joint to a structure fastened at the lower end of a vertical drive shaft which carries at its upper end corresponding drag arms leading the rake arms by a predetermined angle and connected by cables with the rake arms. Other cables are suspended from the upper end of the drive shaft to adjust the lowest position of the rake arms with relation to the bottom of the settling tank.

Under normal operation the rake arms with the rake blades will, therefore, move through the slurry, behind the drag arms. When the rake blades, however, encounter an increased resistance the rake arms will swing about the universal joint in an arc backwards and upwards to overcome the obstacle and thereafter will return under their own weight to their normal position.

These arrangements have the disadvantage that the rake blades in lifting on an arc change their angle with regard to the slurry and thus lose their efficiency to a certain extent.

It has, therefore, been proposed to replace the universal joints at the rake arm ends by a hinge-type connection allowing only a movement of the rake arm in a vertical plane, and providing a horizontal slide for the hinge.

Although this construction is an improvement over the earlier cable-controlled thickeners both systems have the disadvantage that not only the hinges but the whole structure permitting free rotation of the rake arms relative to the vertical drive shaft is submerged in the slurry. Thus the structure is subject to heavy wear and tear and in particular to abrasive forces owing to the composition of the slurry. This can lead to increased friction and in extreme cases to complete inhibition of the free movement of the rake arms relative to the drive shaft.

It is an object of the invention to overcome this disadvantage. This object is achieved according to the invention by a cable-controlled thickener of the central column type having one or more cable supported rake arms with scraper blades attached thereto for shifting the contents in a settling tank on rotation of said rake arm(s) around said central column, said thickener comprising a drive cage having one or more drag arms extending therefrom and being rotatably mounted on said column above the highest liquid level in said tank, driving means for said drive cage, a lower cage freely rotatably mounted below said drive cage in alignment therewith, said lower cage near its lower end having one or more rake arms hinged thereto for movement of each rake arm in a vertical plane, each said rake arm being supported and moved in a circular movement through said settling tank by cable means connecting the rake arm with a corresponding drag arm of said drive cage, whereby any change in load on said scraper blades produces relative movement between said drive cage and said lower cage thus moving each rake arm in a vertical plane only by the corresponding cable means thus maintaining the rake arm truly radial to the thickener tank. In this way only the hinges for the vertical movement of the rake arms are submerged but all bearing surfaces for the rotational movement of the rake arm around the axis are not subject to slurry ingress, and thus wear and tear is substantially reduced.

The term "cage" used herein is to be interpreted in its widest sense and includes an open structure as shown in the embodiment as well as a sleeve or similar tubular arrangement with a circular or rectangular cross-section.

Figure 2:
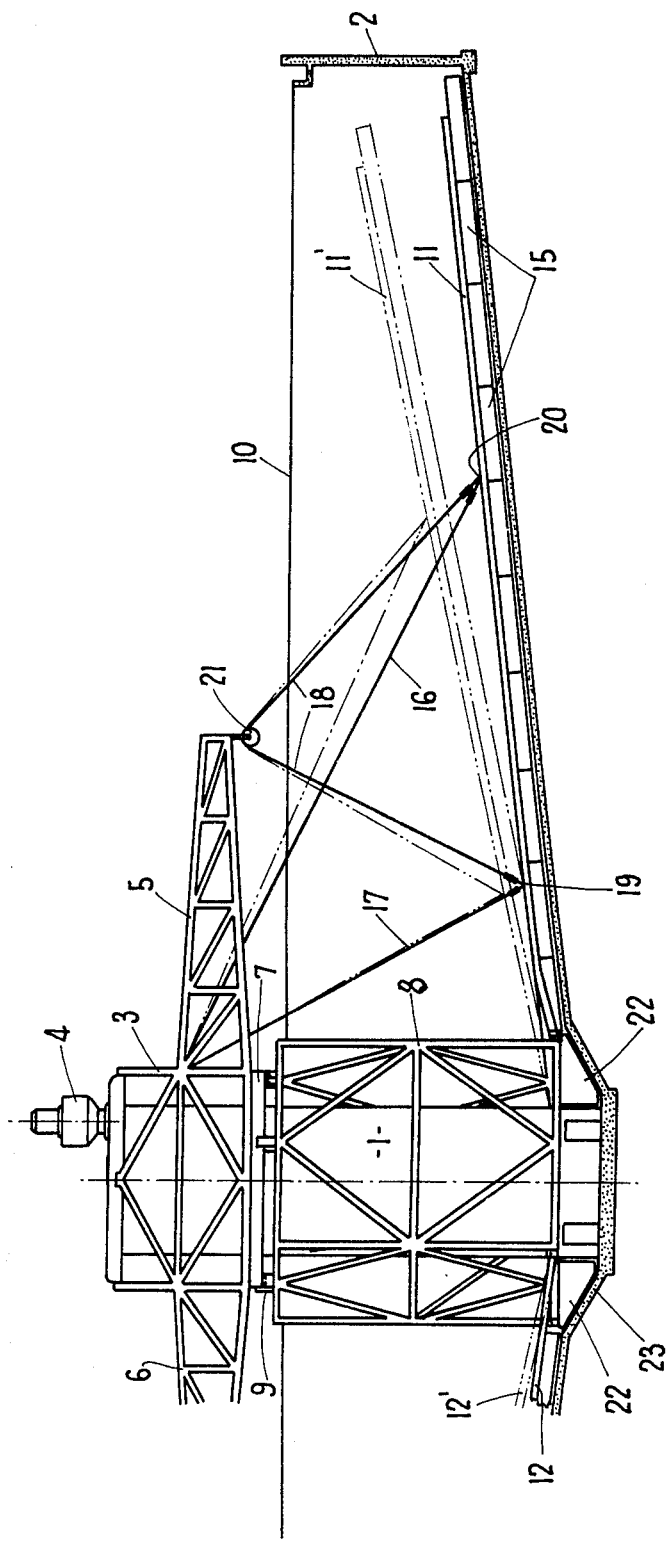
Figure 3:
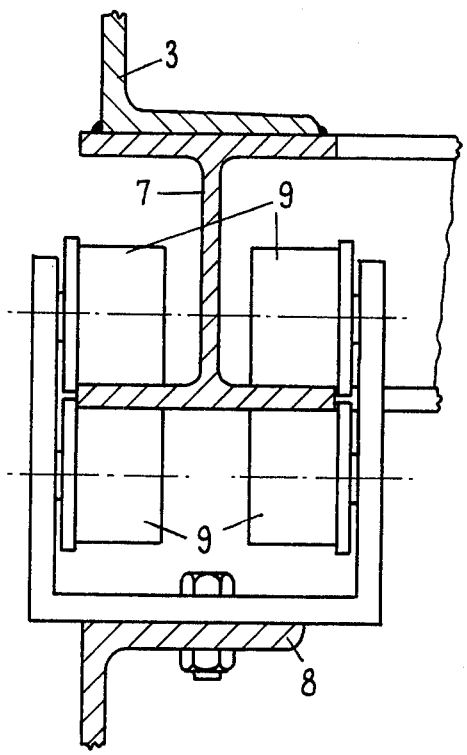
Figure 4:
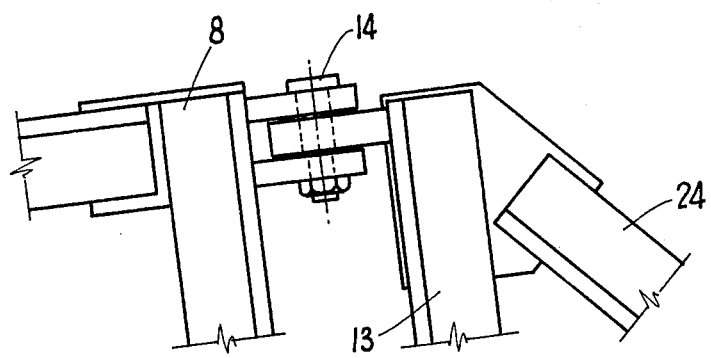

One embodiment of the invention will be described hereinafter in more detail in connection with the drawings in which:

FIG. 1 is a plan view of part of a cable controlled thickener and settling tank according to the invention, FIG. 2 is a side view of the thickener of FIG. 1 along line A—A, FIG. 3 shows details of the monorail suspension of the lower cage shown in FIG. 2, and FIG. 4 shows details of the hinge arrangement for the rake arm shown in FIG. 1.

In FIGS. 1 and 2 a centre column thickener is shown which has a centre column 1 mounted in the centre of the settling tank 2. The column 1 supports a drive cage 3 which is rotatably mounted on the column and is driven by a suitable driving mechanism 4.

The drive cage 3 carries two oppositely extending drag arms 5 and 6. Below the drag arms 5 and 6 and secured either to cage 3 (as shown in the drawings) or to column 1 is an annular monorail 7. This monorail 7 forms the support for a lower cage 8 which is concentric with the column 1 and therefore in alignment with the drive cage 3 The lower cage 8, which in this embodiment has a square cross-section, is suspended from the monorail 7, by means of rollers 9 (FIG. 3) evenly spaced around the circumference of cage 8 and permitting free rotation of cage 8 around the centre column 1. The drive cage 3 as well as the monorail 7 and thus the rollers 9 are all arranged above the highest level 10 which the slurry may reach in the settling tank 1.

The lower end of cage 8 which extends into the slurry carries two oppositely arranged rake arms 11 and 12 corresponding to the drag arms 5 and 6. The rake arms are connected to the lower cage 8 by a hinge arrangement 13 incorporating two angle struts 24 and two horizontally extending hinge pins 14 for each rake arm arranged at corresponding corners of the cage 8 as shown in more detail in FIG. 4. These hinge arrangements allow a movement of the rake arms in vertical planes and can be designed so robust that they will not be affected to any marked degree by the slurry through which they move.

Each rake arm carries a plurality of scraper blades 15 adjusted to such an angle in relation to the longitudinal axis of the corresponding rake arm that the highest efficiency in operation is achieved.

Each rake arm (11, 12) is supported by a pair of support cables 16, 17 from the drive cage 8. In addition each rake arm (11, 12) is connected with its corresponding drag arm (5, 6) by a drag cable as shown for rake arm 11 by the drag cable 18 which is fixed at points 19 and 20 on the rake arm 11 and passes over a pulley 21 mounted on the drag arm 5.

Under normal operating conditions rotation of the drive cage 3 with drag arms 5 and 6 will impart a corresponding movement through the drag cables 18 to the rake arms 11 and 12 which thus will rotate around the centre column 1 at the same speed and no relative movement between the drive cage 3 and the lower cage 8 will occur.

In case the scraper blades 15, however, encounter an obstacle which increases the pressure on the blades, the movement of the rake arms 11, 12 is retarded relative to the movement of the drag arms 5, 6. Thus a pull is exerted on the drag cables 18 which will swing the rake arms 11, 12 upwards as shown in dotted lines 11' and 12', whereby the cable 18 moves over the pulley 21 to equalize the pull on the two cable connection points 19 and 20.

As the rake arms 11, 12 can only move in a vertical plane by means of the hinge arrangement 13, as explained above, the centre line of each rake arm remains radial with respect to the central vertical axis of the settling tank 2 under all load conditions and thus the angle of the scraper blades 15 with regard to their direction of movement through the slurry remains unchanged, so that the highest efficiency can be maintained.

When the obstacle is overcome and thus the pressure on the scraper blades 15 is reduced again, the rake arms 11 and 12 move downwards under their own weight and drive cage 3 and lower cage 8 move together as mentioned before.

As the monorail 7 and the rollers 9 are mounted above the slurry level 10 the free movement of the rollers on the rail can never be impaired and thus the movements of the rake arms 11, 12 will respond freely to changes in drag on the scraper blades 15.

As only comparatively small angular movements between the drag arms 5, 6 and rake arms 11, 12 are required for lifting the rake arms sufficiently to overcome resistance in the slurry the annular monorail can be replaced by two or more monorail segments mounted on the drive cage 8 depending on the number of suspension points for the lower cage 8.

In known manner the lower cage 8 may carry at its lower end a plurality of cone scraper blades 22 to scrape the central conical part 23 of the settling tank 2.

The foregoing detailed description refers only to one embodiment of the invention and modifications can be made without departing from the scope thereof. Thus, for example, the monorail may be mounted on the lower cage and the rollers on the drive cage or the monorail suspension may be replaced by any other type of suspension permitting relative angular movement between the drive cage and the lower cage carrying the rake arms.

We claim:

1. A cable-controlled thickener of the central column type having at least one cable supported rake arm with scraper blades attached thereto for shifting the contents in a settling tank on rotation of said rake arm around said central column, said thickener comprising a drive cage having at least one drag arm extending therefrom and being rotatably mounted on said column above the highest liquid level in said tank, driving means for said drive cage, a lower cage freely rotatably mounted below said drive cage above the highest liquid level in said tank in alignment with said drive cage, said lower cage near its lower end having hinge means to hinge at least one rake arm to said lower cage, said hinge means permitting movement of said rake arm only in a vertical plane, cable means connecting the drag arm of the drive cage with said rake arm; said cable means comprising a pair of support cables with the first ends of each fixedly connected to spaced apart points on the corresponding rake arm, a drag cable passing around a pulley located at the end of each drag arm opposite the drive cage and with its opposite ends connected to said support cable spaced apart points on the rake arm whereby, with changes in load on the rake arm and pivotal movement upward in a vertical plane relative rotational movement between the upper drive cage and freely rotatable lower cage maintains loading on the support cables and equalized pull on the drag cable.

2. The cable-controlled thickener as claimed in claim 1 wherein an annular monorail is mounted at the lower end of the drive cage and wherein a plurality of rollers are evenly spaced around the upper end of said lower cage, said rollers engaging said monorail for relative annular movement between said drive cage and said lower cage.

3. The cable-controlled thickener as claimed in claim 2 wherein the cable means for each rake arm comprise support cables connecting the rake arm with the drive cage and a drag cable, and wherein the drag arm is provided with a equalizing pulley and the drag cable is passing around said pulley and has its ends fixed to spaced apart points of said rake arm.

4. The cable-controlled thickener as claimed in claim 3 wherein the drive cage has two oppositely extending drag arms and the lower cage has two corresponding oppositely extending rake arms.

5. The cable-controlled thickener as claimed in claim 1 and having a plurality of spaced apart cone scraper blades mounted on the lower end of the lower cage.

6. In a cable-controlled thickener of the central column type having two oppositely extending cable supported rake arms with scraper blades attached thereto for shifting the contents in a settling tank on rotation of said rake arms around said central column, the improvement comprising a drive cage rotatably mounted on said column above the highest liquid level in the tank, driving means for said drive cage, two oppositely extending drag arms on said drive cage, a lower cage above the highest liquid level in the tank permitting rotational relative movement between said cages, a rake arm hinge arrangement on two opposite sides of said lower cage, each hinge arrangement being formed by two struts at the end of each rake arm and two horizontally extending hinge pins permitting movement of each rake arm in a vertical plane only, cable means comprising a pair of support cables with the first ends of each fixedly connected to said drive cage and the other ends of each fixedly connected to spaced apart points on the corresponding rate arm, a drag cable passing around a pulley located at the end of each drag arm opposite the drive cage and with its opposite ends connected to said support cable spaced apart points on the rake arm whereby, with changes in load on the rake arm and pivotal movement upward in a vertical plane relative rotational movement between the upper drive cage and freely rotatable lower cage maintains loading on the support cables and equalized pull on the drag cable.

7. The improvement as claimed in claim 6, wherein said suspension means comprises a monorail on the lower end of said drive cage and a plurality of rollers at the upper end of said lower cage, said rollers engaging said monorail.

* * * * *